(12) United States Patent
Chu et al.

(10) Patent No.: US 11,032,787 B2
(45) Date of Patent: Jun. 8, 2021

(54) BASIC SERVICE SET (BSS) COLOR IN NULL DATA PACKET (NDP) RANGING

(71) Applicant: NXP USA, Inc., Austin, TX (US)

(72) Inventors: Liwen Chu, San Ramon, CA (US); Christian Berger, San Jose, CA (US); Niranjan Grandhe, San Jose, CA (US); Hongyuan Zhang, Fremont, CA (US); Hui-Ling Lou, Sunnyvale, CA (US)

(73) Assignee: NXP USA, INC., Austin, TX (US)

( * ) Notice: Subject to any disclaimer, the term of this patent is extended or adjusted under 35 U.S.C. 154(b) by 65 days.

(21) Appl. No.: 16/051,186

(22) Filed: Jul. 31, 2018

(65) Prior Publication Data
US 2019/0306824 A1  Oct. 3, 2019

Related U.S. Application Data

(60) Provisional application No. 62/651,554, filed on Apr. 2, 2018.

(51) Int. Cl.
*H04W 4/00* (2018.01)
*H04W 72/04* (2009.01)
(Continued)

(52) U.S. Cl.
CPC .......... *H04W 64/00* (2013.01); *H04B 7/0452* (2013.01); *H04B 7/0636* (2013.01);
(Continued)

(58) Field of Classification Search
CPC ..... H04W 64/00; H04W 24/00; H04W 88/00; H04W 84/12; H04B 7/0452; H04B 7/0636; H04L 5/0048
See application file for complete search history.

(56) References Cited

U.S. PATENT DOCUMENTS 9,781,566 B1 *  10/2017  Rison .................. H04L 43/0864
2005/0026563 A1   2/2005  Leeper et al.
(Continued)

FOREIGN PATENT DOCUMENTS

| WO | WO-2017/180747 | 10/2017 | |
| WO | WO-2017180747 A2 * | 10/2017 | ............ H04W 84/12 |
| WO | WO-2018/004983 | 1/2018 | |

OTHER PUBLICATIONS

Chu et al., "BSS Color in NDP Ranging," IEEE Draft 802.11-18/893r1, 6 pages (May 6, 2018).
(Continued)

*Primary Examiner* — Maharishi V Khirodhar

(57) ABSTRACT

A communication device determines an identifier of a wireless network with which the communication device is not associated. While the communication device is not associated with the wireless network, the communication device participates in a ranging procedure with an access point (AP) of the wireless network. The ranging procedure is for estimating a distance between the communication device and the AP based on measuring times of flight of transmissions between the communication device and the AP. Participating in the ranging procedure includes: the communication device transmitting a packet to the AP as part of the ranging procedure. The packet includes a PHY preamble, and the PHY preamble includes a signal field. The signal field includes a wireless network identifier subfield set to the identifier of the wireless network.

13 Claims, 7 Drawing Sheets

(51) Int. Cl.
  H04W 88/08    (2009.01)
  H04W 64/00    (2009.01)
  H04L 5/00     (2006.01)
  H04B 7/0452   (2017.01)
  H04B 7/06     (2006.01)
  H04W 24/00    (2009.01)
  H04W 88/00    (2009.01)
  H04W 84/12    (2009.01)

(52) U.S. Cl.
  CPC ........... *H04L 5/0048* (2013.01); *H04W 24/00* (2013.01); *H04W 88/00* (2013.01); *H04W 84/12* (2013.01)

(56) References Cited

U.S. PATENT DOCUMENTS

| | | | | |
|---|---|---|---|---|
| 2013/0272137 | A1* | 10/2013 | Kwon | H04W 74/04 370/241 |
| 2015/0282043 | A1* | 10/2015 | Fang | H04W 52/241 370/329 |
| 2017/0013584 | A1* | 1/2017 | Banin | H04W 64/00 |
| 2017/0135019 | A1* | 5/2017 | Vamaraju | H04B 17/318 |
| 2017/0251449 | A1* | 8/2017 | Malik | H04W 64/003 |
| 2017/0261591 | A1* | 9/2017 | Zhang | G01S 5/14 |
| 2017/0289987 | A1* | 10/2017 | Seok | H04W 72/0406 |
| 2018/0007651 | A1* | 1/2018 | Vamaraju | H04W 8/24 |
| 2018/0007689 | A1* | 1/2018 | Patil | H04W 72/0446 |
| 2018/0011179 | A1* | 1/2018 | Zhang | H04L 69/22 |
| 2018/0027561 | A1 | 1/2018 | Segev et al. | |
| 2018/0110046 | A1* | 4/2018 | Patil | H04W 74/006 |
| 2018/0279209 | A1* | 9/2018 | Fang | H04W 48/12 |
| 2019/0090249 | A1* | 3/2019 | Han | H04W 72/0446 |
| 2019/0246314 | A1* | 8/2019 | Tanaka | H04W 72/04 |
| 2020/0015141 | A1* | 1/2020 | Shi | H04W 72/046 |

OTHER PUBLICATIONS

IEEE P802.11ax™/D2.2, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for High Efficiency WLAN," IEEE Computer Society, 620 pages (Feb. 2018).

IEEE P802.11az™/D0.1, "Draft Standard for Information Technology—Telecommunications and Information Exchange Between Systems Local and Metropolitan Area Networks—Specific Requirements Part 11: Wireless LAN Medium Access Control (MAC) and Physical Layer (PHY) Specifications—Amendment 8: Enhancements for Positioning," IEEE Computer Society, 44 pages (Nov. 2017).

IEEE Std 802.11-REVmc™/D8.0 (revision of IEEE Std. 802.11™-2012) "Draft Standard for Information technology—Telecommunications and information exchange between systems—Local and metropolitan area networks—Specific requirements" Part 11: Wireless LAN Medium Access Control (MAC) and Physical Layer (PHY) Specifications, *The Institute of Electrical and Electronics Engineers, Inc.*, 3774 pages (Aug. 2016).

International Search Report and Written Opinion in International Patent Application No. PCT/US2018/044684, dated Sep. 20, 2018 (13 pages).

Ma et al., "Dynamic Sounding for Multi-User MIMO in Wireless LANs," IEEE Transactions on consumer Electornics, vol. 63, No. 2, pp. 135-144 (May 1, 2017).

Zhu et al., "IEEE P802.11, Wireless LANs, Proposed 802.11az Functional Requirements," *Institute of Electrical and Electronics Engineers*, doc. IEEE 802.11-16/0424r4, 6 pages (Mar. 13, 2017).

* cited by examiner

BASIC SERVICE SET (BSS) COLOR IN NULL DATA PACKET (NDP) RANGING

CROSS REFERENCES TO RELATED APPLICATIONS

This application claims the benefit of U.S. Provisional Patent Application No. 62/651,554, entitled "Basic Service Set (BSS) Color in Null Data Packet (NDP) Ranging," filed on Apr. 2, 2018, the disclosure of which is expressly incorporated herein by reference in its entirety.

FIELD OF TECHNOLOGY

The present disclosure relates generally to wireless communication systems, and more particularly to communication exchanges between wireless communication devices for ranging measurements among the wireless communication devices.

BACKGROUND

Wireless local area networks (WLANs) have evolved rapidly over the past decade, and development of WLAN standards such as the Institute for Electrical and Electronics Engineers (IEEE) 802.11 Standard family has improved single-user peak data throughput. For example, the IEEE 802.11b Standard specifies a single-user peak throughput of 11 megabits per second (Mbps), the IEEE 802.11a and 802.11g Standards specify a single-user peak throughput of 54 Mbps, the IEEE 802.11n Standard specifies a single-user peak throughput of 600 Mbps, and the IEEE 802.11ac Standard specifies a single-user peak throughput in the gigabits per second (Gbps) range. Future standards promise to provide even greater throughput, such as throughputs in the tens of Gbps range.

Some mobile communication devices include a WLAN network interface and satellite positioning technology, such as global positioning system (GPS) technology. GPS technology in mobile communication devices is useful for navigating to a desired location, for example. However, GPS technology does not typically provide accurate location information when a GPS receiver is not in direct sight of a GPS satellite, and thus GPS technology is often not useful for providing location information while a mobile communication device is within a building such as an airport, a shopping mall, etc., within a tunnel, etc.

Techniques for determining a position of a communication device using WLAN technology are now under development. For example, a distance between a first communication and a second communication device is determined by measuring a time of flight of WLAN transmissions between the first communication device and the second communication device, and the distance is determined based on the measured time of flight. Similarly, distances between the first communication device and multiple third communication devices are determined. Then, the determined distances are used to estimate a location of the first communication device by employing, for example, a triangulation technique. For a first communication device having multiple antennas, an angle of departure (AoD) of a WLAN transmission can be determined. Similarly, for a second communication device having multiple antennas, an angle of arrival (AoA) of the WLAN transmission from the first communication device can be determined. The AoD and the AoA, along with the determined distances, can be also be used for estimating the location of the first communication device.

SUMMARY

In an embodiment, a method includes: determining, at a communication device, an identifier of a wireless network with which the communication device is not associated; and while the communication device is not associated with the wireless network, participating, by the communication device, in a ranging procedure with an access point (AP) of the wireless network. The ranging procedure is for estimating a distance between the communication device and the AP based on measuring times of flight of transmissions between the communication device and the AP. Participating in the ranging procedure includes: transmitting, by the communication device, a packet to the AP as part of the ranging procedure, wherein the packet includes a PHY preamble, wherein the PHY preamble includes a signal field, and wherein the signal field includes a wireless network identifier subfield set to the identifier of the wireless network.

In another embodiment, an apparatus comprises: a network interface device associated with a communication device. The network interface device includes one or more integrated circuit (IC) devices, and the one or more IC devices are configured to: determine an identifier of a wireless network with which the communication device is not associated, and while the communication device is not associated with the wireless network, participate in a ranging procedure with an access point (AP) of the wireless network. The ranging procedure is for estimating a distance between the communication device and the AP based on measuring times of flight of transmissions between the communication device and the AP. Participating in the ranging procedure includes: transmitting a packet to the AP as part of the ranging procedure, wherein the packet includes a PHY preamble, wherein the PHY preamble includes a signal field, and wherein the signal field includes a wireless network identifier subfield set to the identifier of the wireless network.

DETAILED DESCRIPTION

Ranging measurement procedures and techniques described below are discussed in the context of wireless local area networks (WLANs) that utilize protocols the same as or similar to protocols defined by the 802.11 Standard from the Institute of Electrical and Electronics Engineers (IEEE) merely for explanatory purposes. In other embodiments, however, ranging measurement procedures and techniques are utilized in other types of wireless communication systems such as personal area networks (PANs), mobile communication networks such as cellular networks, metropolitan area networks (MANs), etc.

Figure 1:
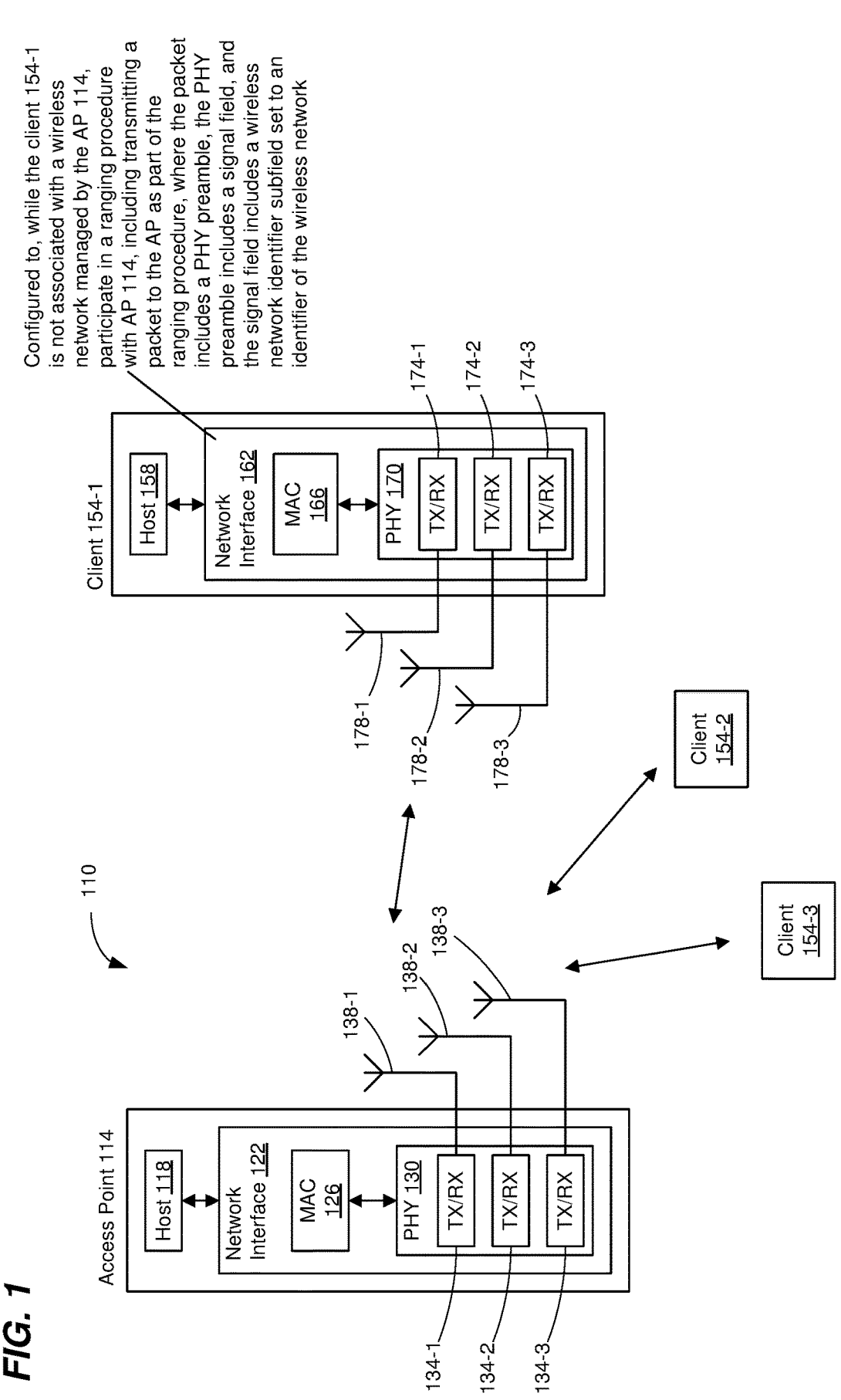
FIG. 1 is a block diagram of an example wireless local area network (WLAN), according to an embodiment.

FIG. 1 is a block diagram of an example WLAN 110, according to an embodiment. The WLAN 110 includes an access point (AP) 114 that comprises a host processor 118 coupled to a network interface device 122. The network interface 122 includes a medium access control (MAC) processor 126 and a physical layer (PHY) processor 130. The PHY processor 130 includes a plurality of transceivers 134, and the transceivers 134 are coupled to a plurality of antennas 138. Although three transceivers 134 and three antennas 138 are illustrated in FIG. 1, the AP 114 includes other suitable numbers (e.g., 1, 2, 4, 5, etc.) of transceivers 134 and antennas 138 in other embodiments. In some embodiments, the AP 114 includes a higher number of antennas 138 than transceivers 134, and antenna switching techniques are utilized.

The network interface 122 is implemented using one or more integrate circuits (ICs) configured to operate as discussed below. For example, the MAC processor 126 may be implemented, at least partially, on a first IC, and the PHY processor 130 may be implemented, at least partially, on a second IC. As another example, at least a portion of the MAC processor 126 and at least a portion of the PHY processor 130 may be implemented on a single IC. For instance, the network interface 122 may be implemented using a system on a chip (SoC), where the SoC includes at least a portion of the MAC processor 126 and at least a portion of the PHY processor 130.

In an embodiment, the host processor 118 includes a processor configured to execute machine readable instructions stored in a memory device (not shown) such as a random access memory (RAM), a read-only memory (ROM), a flash memory, etc. In an embodiment, the host processor 118 may be implemented, at least partially, on a first IC, and the network device 122 may be implemented, at least partially, on a second IC. As another example, the host processor 118 and at least a portion of the network interface 122 may be implemented on a single IC.

In various embodiments, the MAC processor 126 and/or the PHY processor 130 of the AP 114 are configured to generate data units, and process received data units, that conform to a WLAN communication protocol such as a communication protocol conforming to the IEEE 802.11 Standard or another suitable wireless communication protocol. For example, the MAC processor 126 may be configured to implement MAC layer functions, including MAC layer functions of the WLAN communication protocol, and the PHY processor 130 may be configured to implement PHY functions, including PHY functions of the WLAN communication protocol. For instance, the MAC processor 126 may be configured to generate MAC layer data units such as MAC service data units (MSDUs), MAC protocol data units (MPDUs), etc., and provide the MAC layer data units to the PHY processor 130. The PHY processor 130 may be configured to receive MAC layer data units from the MAC processor 126 and encapsulate the MAC layer data units to generate PHY data units such as PHY protocol data units (PPDUs) for transmission via the antennas 138. Similarly, the PHY processor 130 may be configured to receive PHY data units that were received via the antennas 138, and extract MAC layer data units encapsulated within the PHY data units. The PHY processor 130 may provide the extracted MAC layer data units to the MAC processor 126, which processes the MAC layer data units.

The PHY processor 130 is configured to downconvert one or more radio frequency (RF) signals received via the one or more antennas 138 to one or more baseband analog signals, and convert the analog baseband signal(s) to one or more digital baseband signals, according to an embodiment. The PHY processor 130 is further configured to process the one or more digital baseband signals to demodulate the one or more digital baseband signals and to generate a PPDU. The PHY processor 130 includes amplifiers (e.g., a low noise amplifier (LNA), a power amplifier, etc.), a radio frequency (RF) downconverter, an RF upconverter, a plurality of filters, one or more analog-to-digital converters (ADCs), one or more digital-to-analog converters (DACs), one or more discrete Fourier transform (DFT) calculators (e.g., a fast Fourier transform (FFT) calculator), one or more inverse discrete Fourier transform (IDFT) calculators (e.g., an inverse fast Fourier transform (IFFT) calculator), one or more modulators, one or more demodulators, etc.

The PHY processor 130 is configured to generate one or more RF signals that are provided to the one or more antennas 138. The PHY processor 130 is also configured to receive one or more RF signals from the one or more antennas 138.

The MAC processor 126 is configured to control the PHY processor 130 to generate one or more RF signals by, for example, providing one or more MAC layer data units (e.g., MPDUs) to the PHY processor 130, and optionally providing one or more control signals to the PHY processor 130, according to some embodiments. In an embodiment, the MAC processor 126 includes a processor configured to execute machine readable instructions stored in a memory device (not shown) such as a RAM, a read ROM, a flash memory, etc. In an embodiment, the MAC processor 126 includes a hardware state machine.

The WLAN 110 includes a plurality of client stations 154. Although three client stations 154 are illustrated in FIG. 1, the WLAN 110 includes other suitable numbers (e.g., 1, 2, 4, 5, 6, etc.) of client stations 154 in various embodiments. The client station 154-1 includes a host processor 158 coupled to a network interface device 162. The network interface 162 includes a MAC processor 166 and a PHY processor 170. The PHY processor 170 includes a plurality of transceivers 174, and the transceivers 174 are coupled to a plurality of antennas 178. Although three transceivers 174 and three antennas 178 are illustrated in FIG. 1, the client station 154-1 includes other suitable numbers (e.g., 1, 2, 4, 5, etc.) of transceivers 174 and antennas 178 in other embodiments. In some embodiments, the client station 154-1 includes a higher number of antennas 178 than transceivers 174, and antenna switching techniques are utilized.

The network interface 162 is implemented using one or more ICs configured to operate as discussed below. For example, the MAC processor 166 may be implemented on at least a first IC, and the PHY processor 170 may be implemented on at least a second IC. As another example, at least a portion of the MAC processor 166 and at least a portion of the PHY processor 170 may be implemented on a single IC. For instance, the network interface 162 may be implemented using an SoC, where the SoC includes at least a portion of the MAC processor 166 and at least a portion of the PHY processor 170.

In an embodiment, the host processor 158 includes a processor configured to execute machine readable instructions stored in a memory device (not shown) such as a RAM, a ROM, a flash memory, etc. In an embodiment, the host processor 158 may be implemented, at least partially, on a first IC, and the network device 162 may be implemented, at least partially, on a second IC. As another example, the host processor 158 and at least a portion of the network interface 162 may be implemented on a single IC.

In various embodiments, the MAC processor 166 and the PHY processor 170 of the client device 154-1 are configured to generate data units, and process received data units, that conform to the WLAN communication protocol or another suitable communication protocol. For example, the MAC processor 166 may be configured to implement MAC layer functions, including MAC layer functions of the WLAN communication protocol, and the PHY processor 170 may be configured to implement PHY functions, including PHY functions of the WLAN communication protocol. The MAC processor 166 may be configured to generate MAC layer data units such as MSDUs, MPDUs, etc., and provide the MAC layer data units to the PHY processor 170. The PHY processor 170 may be configured to receive MAC layer data units from the MAC processor 166 and encapsulate the MAC layer data units to generate PHY data units such as PPDUs for transmission via the antennas 178. Similarly, the PHY processor 170 may be configured to receive PHY data units that were received via the antennas 178, and extract MAC layer data units encapsulated within the PHY data units. The PHY processor 170 may provide the extracted MAC layer data units to the MAC processor 166, which processes the MAC layer data units.

The PHY processor 170 is configured to downconvert one or more RF signals received via the one or more antennas 178 to one or more baseband analog signals, and convert the analog baseband signal(s) to one or more digital baseband signals, according to an embodiment. The PHY processor 170 is further configured to process the one or more digital baseband signals to demodulate the one or more digital baseband signals and to generate a PPDU. The PHY processor 170 includes amplifiers (e.g., an LNA, a power amplifier, etc.), an RF downconverter, an RF upconverter, a plurality of filters, one or more ADCs, one or more DACs, one or more DFT calculators (e.g., an FFT calculator), one or more IDFT calculators (e.g., an IFFT calculator), one or more modulators, one or more demodulators, etc.

The PHY processor 170 is configured to generate one or more RF signals that are provided to the one or more antennas 178. The PHY processor 170 is also configured to receive one or more RF signals from the one or more antennas 178.

The MAC processor 166 is configured to control the PHY processor 170 to generate one or more RF signals by, for example, providing one or more MAC layer data units (e.g., MPDUs) to the PHY processor 170, and optionally providing one or more control signals to the PHY processor 170, according to some embodiments. In an embodiment, the MAC processor 166 includes a processor configured to execute machine readable instructions stored in a memory device (not shown) such as a RAM, a ROM, a flash memory, etc. In an embodiment, the MAC processor 166 includes a hardware state machine.

In an embodiment, each of the client stations 154-2 and 154-3 has a structure that is the same as or similar to the client station 154-1. Each of the client stations 154-2 and 154-3 has the same or a different number of transceivers and antennas. For example, the client station 154-2 and/or the client station 154-3 each have only two transceivers and two antennas (not shown), according to an embodiment.

PPDUs are sometimes referred to herein as packets. MPDUs are sometimes referred to herein as frames.

In an embodiment, the AP 114 manages a wireless network sometimes referred to as a basic service set (BSS). Client stations perform an association procedure with the AP 114 to join a BSS. For example, the association procedure involves a client station transmitting an association request frame to the AP 114, and the AP 114, in response to receiving the association request frame, transmitting an association response frame to the client station. Also as part of the association procedure and when the AP 114 has determined that the client station can join the BSS, the AP 114 assigns an identifier (referred to herein as an "association identifier" or "AID") to the client station, and informs the client station of the AID assigned to the client station. Joining a BSS is sometimes referred to as "becoming associated with the BSS". A client station that currently belongs to a BSS is sometimes referred to as an "associated client station". Client stations that do not belong to a BSS are sometimes referred to as "unassociated client stations." While a client station is associated with the BSS, the AP 114 and the client station use the AID assigned to the client station in PPDUs and/or MPDUs exchanged between the AP 114 and associated client station.

The AP 114 selects a non-globally unique identifier of the BSS (sometimes referred to as a "BSS color ID" or a "BSS color"). The BSS color ID is significantly shorter than a BSS ID, which is typically a MAC address (e.g., a MAC address of the AP 114). For example, the BSS color ID may have a length that is less than 10 bits (e.g., six bits or another suitable length), whereas the BSS ID may have a length of 48 bits. The BSS color ID is included in PHY preambles of packets and is used by communication devices to distinguish a transmission within BSS (e.g., a transmission from one communication device in the BSS to another communication device in the BSS, sometimes referred to as an "intra-BSS packet") from transmissions from other neighboring BSSs (sometimes referred to as an "inter-BSS packet"). The BSS color ID is useful for various purposes such as avoiding interference (e.g., determining to set a network allocation vector (NAV) when a packet is an intra-BSS packet), power saving (e.g., stopping processing of a packet if the BSS color ID of the packet indicates that the packet is an inter-BSS packet), spatial reuse (e.g., determining that a communication device can transmit during an inter-BSS packet), etc.

When a client station becomes associated with a BSS, the client station is to include the BSS color ID corresponding to the BSS in the PHY preamble of any intra-BSS packets transmitted by the client station. In an embodiment, a communication protocol specifies that the AP 114 must select a BSS color ID for the BSS that is within a specified range of values (e.g., 1-63 or another suitable range of values); the communication protocol also specifies that, when a communication device transmits a packet to another communication device in a BSS to which the communication device does not belong, the communication device is to set the BSS color ID in the packet to a predetermined value (e.g., zero or another suitable value) that is not included in the specified range, and which is reserved for a transmission of a packet to another communication device in a BSS to which the transmitting device does not belong.

Figure 2A:
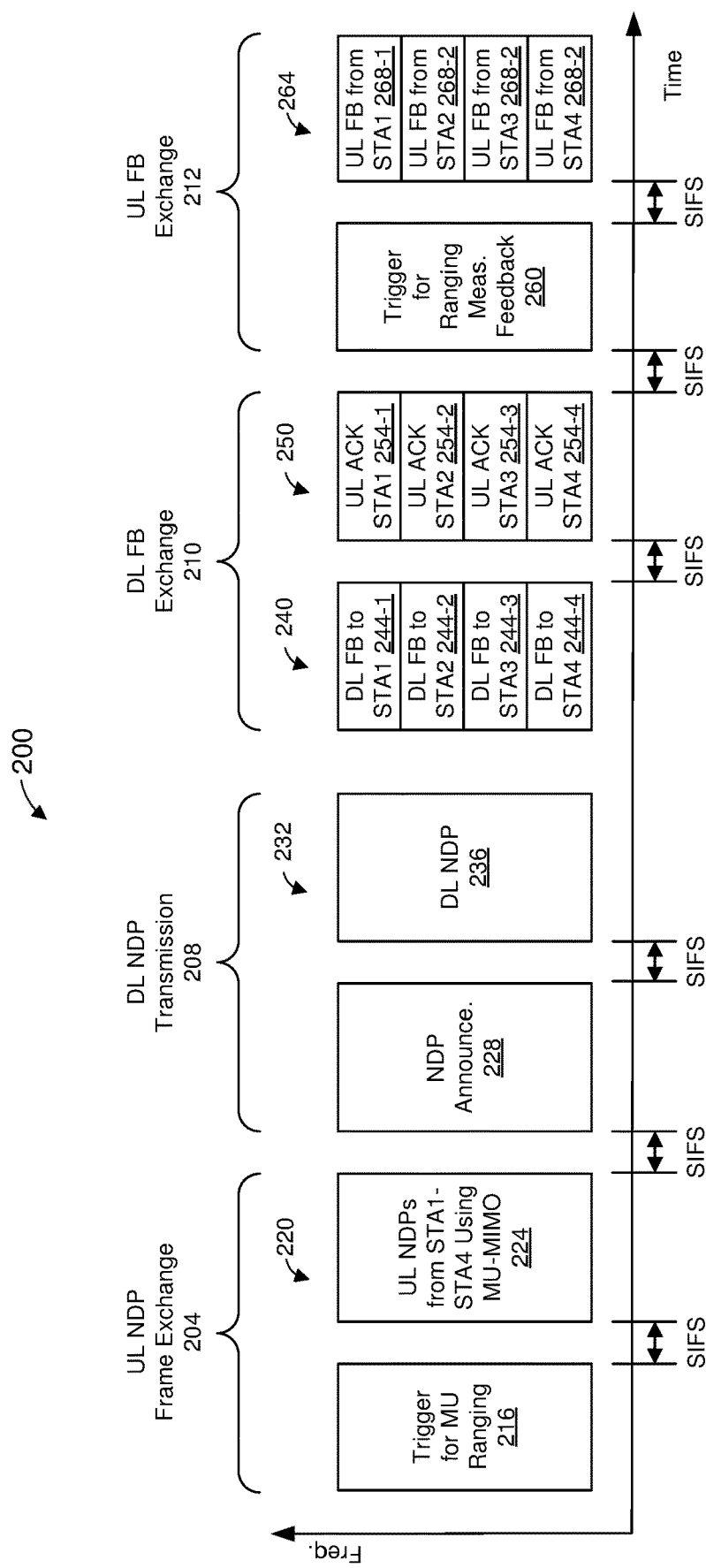
FIG. 2A is a diagram of an example multi-user (MU) ranging measurement exchange in an MU ranging measurement procedure, according to an embodiment.

FIG. 2A is a diagram of an example multi-user (MU) ranging measurement exchange 200 in an MU ranging measurement procedure, according to an embodiment. The diagram 200 is described in the context of the example network 110 merely for explanatory purposes. In some embodiments, signals illustrated in FIG. 2A are generated by other suitable communication devices in other suitable types of wireless networks.

The MU ranging measurement exchange 200 corresponds to an AP-initiated MU ranging measurement exchange, according to an embodiment. The MU ranging measurement exchange 200 includes an uplink (UL) null data packet (NDP) frame exchange 204, a downlink (DL) NDP transmission portion 208, a DL feedback (FB) frame exchange 210, and an UL FB frame exchange 212. In an embodiment, the uplink UL NDP frame exchange 204, the DL NDP transmission portion 208, the DL FB frame exchange 210, and the UL FB frame exchange 212 occur within a single transmit opportunity period (TXOP). In another embodiment, the uplink UL NDP frame exchange 204, the DL NDP transmission portion 208, the DL FB frame exchange 210, and the UL FB frame exchange 212 do not occur within a single TXOP. For example, the uplink UL NDP frame exchange 204 and the DL NDP transmission portion 208 occur within a single TXOP, whereas the DL FB frame exchange 210 and the UL FB frame exchange 212 occur after the single TXOP (e.g., in another TXOP or in multiple other TXOPs).

In the UL NDP exchange 204, a first communication device (e.g., the AP 114) transmits a DL PPDU 216 that includes a trigger frame to cause a group of multiple second communication devices (e.g., client stations 154) to simultaneously transmit, as part of an uplink (UL) MU transmission 220, UL null data packets (NDPs) 224. In an embodiment, the trigger frame in the PPDU 216 is a type of trigger frame specifically for initiating an MU ranging measurement exchange such as the MU ranging measurement exchange 200. The trigger frame in the PPDU 216 causes multiple client stations 154 to begin simultaneously transmitting the UL MU transmission 220 a defined time period after an end of the PPDU 216. In an embodiment, the defined time period is a short interframe space (SIFS) as defined by the IEEE 802.11 Standard. In other embodiments, another suitable time period is utilized.

In an embodiment, the UL MU transmission 220 includes an UL MU multiple input, multiple output (MIMO) transmission having two or more UL NDPs 224 from multiple client stations 154, e.g., STA1, STA2, STA3, and STA4. The two or more of the UL NDPs 224 are transmitted within a same frequency band via different spatial streams (e.g., MU-MIMO). In another embodiment, the UL MU transmission 220 includes an UL orthogonal frequency division multiple access (OFDMA) transmission having two or more UL NDPs 224 from multiple client stations 154, e.g., STA1, STA2, STA3, and STA4, in different respective frequency bandwidth portions. In yet another embodiment, three or more UL NDP packets 224 transmitted using a combination of UL MU-MIMO and UL OFDMA, where at least two NDPs are transmitted using MU-MIMO in a same frequency bandwidth portion via different spatial streams, and at least one NDP is transmitted in at least one other different frequency bandwidth portion. The UL NDPs 224 include PHY preambles having one or more short training fields (STFs), one or more long training fields (LTFs) and one or more signal fields, in an embodiment. In an embodiment, each PHY preamble of each UL NDP 224 includes i) a legacy portion having a legacy STF (L-STF), a legacy LTF (L-LTF), and a legacy signal field (L-SIG), and ii) a non-legacy portion having a high efficiency WiFi STF (HE-STF), one or more high efficiency WiFi LTFs (HE-LTFs), and a high efficiency WiFi signal field (HE-SIG). The UL NDPs 224 omit data portions.

When transmitting the UL NDPs 224, each client station 154 records a time $t_{1,k}$ at which the client station 154 began transmitting a particular portion of the UL NDP 224 (e.g., a first occurring HE-LTF in the UL NDP 224), where k is an index indicating the particular client station 154. Similarly, when the AP 114 receives each UL NDP 224, the AP 114 records a time $t_{2,k}$ at which the AP 114 began receiving the particular portion of the UL NDP 224 (e.g., the first occurring HE-LTF in the UL NDP 224).

In some embodiments, when transmitting the UL NDPs 224, each of at least some of the client stations 154 (e.g., client stations 154 with multiple antennas 174) records an angle of departure, $AoD_{1,k}$, at which the UL NDP 224 left the antennas 178 of the client station 154. Similarly, when the AP 114 receives each UL NDP 224, the AP 114 records an angle of arrival, $AoA_{1,k}$, at which the UL NDP 224 arrived at the antennas 138 of the AP 114.

Figure 2B:
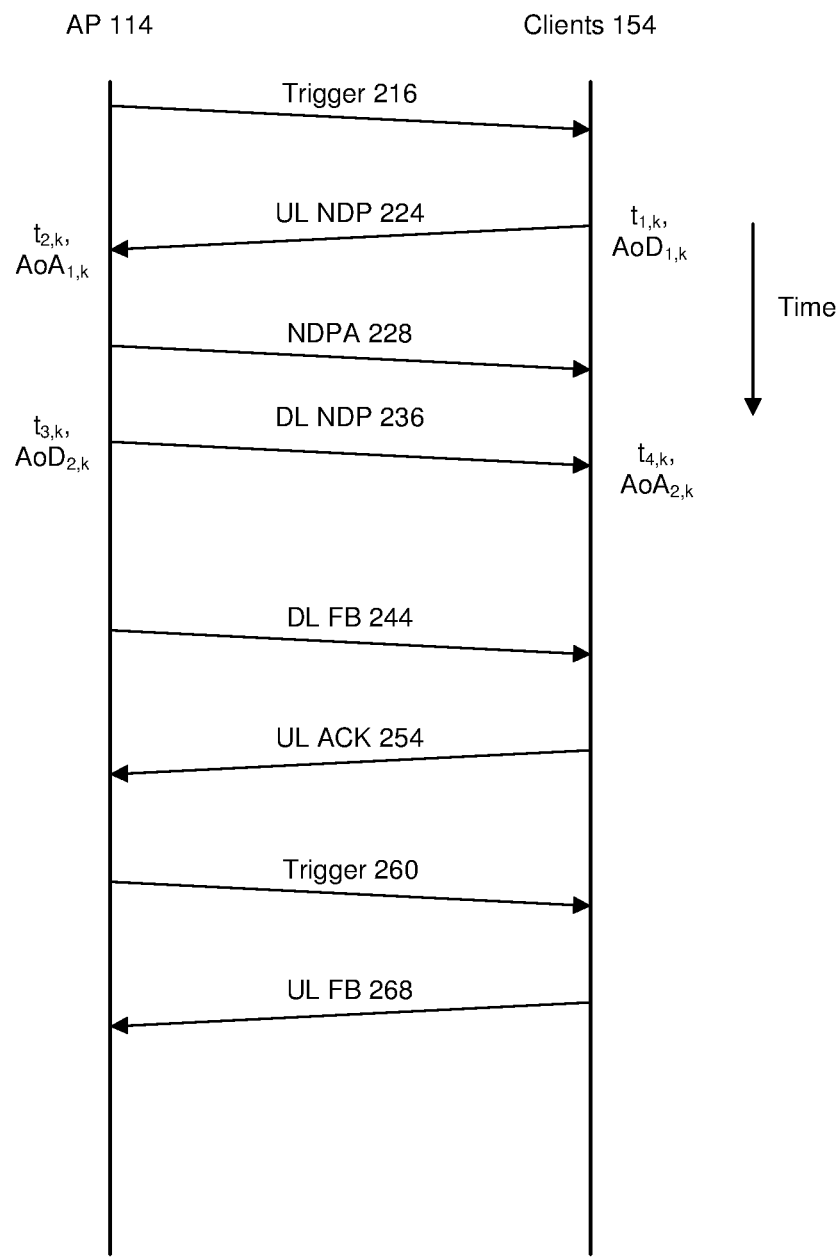
FIG. 2B is a timing diagram of the example MU ranging measurement exchange of FIG. 2A, according to an embodiment.

FIG. 2B is a timing diagram of the example MU ranging measurement exchange 200 of FIG. 2A. As illustrated in FIG. 2B, each client station 154 records the time $t_{1,k}$ at which the client station 154 began transmitting the particular portion of the UL NDP 224 (e.g., the first occurring HE-LTF in the UL NDP 224), and records the $AoD_{1,k}$ at which the UL NDP 224 left the antennas 178 of the client station 154. Additionally, the AP 114 records the time $t_{2,k}$ at which the AP 114 began receiving the particular portion (e.g., a first occurring HE-LTF) in each UL NDP 224, and the $AoA_{1,k}$ at which each UL NDP 224 arrived at the antennas 138 of the AP 114.

Referring now to FIGS. 2A and 2B, responsive to the UL MU transmission 220, the AP 114 begins transmitting a DL PPDU 228 that includes an NDP announcement (NDPA) frame a defined time period after an end of the UL MU transmission 220. In an embodiment, the defined time period is SIFS. In other embodiments, another suitable time period is utilized. The NDPA frame in the PPDU 228 is configured to cause the client stations 154 to be prepared to receive an NDP from the AP 114, according to an embodiment.

The AP 114 generates a DL PPDU 232 and begins transmitting the DL PPDU 232 a defined time period after an end of the DL PPDU 228. In an embodiment, the defined time period is SIFS. In other embodiments, another suitable time period is utilized. The DL PPDU 232 is a MU PPDU that includes DL NDPs 236 to respective client stations 154. In another embodiment, the AP 114 transmits a single DL NDP 236 using a SU DL transmission (e.g., with a broadcast destination address) to the client stations 154. The DL NDP(s) 236 include PHY preamble(s) having one or more STFs, one or more LTFs and one or more signal fields, in an embodiment. In an embodiment, the PHY preamble of the DL NDP 236 includes i) a legacy portion having an L-STF, an L-LTF, and an L-SIG, and ii) a non-legacy portion having an HE-STF, one or more HE-LTFs, and one or more HE-SIGs. The DL NDP(s) 236 omit data portions. In an embodiment, different DL NDPs 236 are transmitted in different frequency bandwidth portions (e.g., OFDMA). In some embodiments, two or more of the DL NDPs 236 are transmitted within a same frequency band (e.g., two or more of the DL NDPs 236 span the same frequency band) using different spatial streams (e.g., the two or more DL NDPs 236 are transmitted using MU-MIMO). In another embodiment, a single DL NDP 236 is broadcast to the client stations 154.

When transmitting the DL NDP(s) 236, the AP 114 records a time $t_{3,k}$ at which the AP 114 began transmitting a particular portion of the DL NDP(s) 236 (e.g., a first occurring HE-LTF in each DL NDP(s) 236). Similarly, when each client station 154 receives the corresponding DL NDP 236, the client station 154 records a time $t_{4,k}$ at which the client station 154 began receiving the particular portion of the DL NDP 236 (e.g., the first occurring HE-LTF in the DL NDP 236). As illustrated in FIG. 2B, the AP 114 records the time $t_{3,k}$ at which the AP 114 began transmitting the particular portion of the DL NDP 236 (e.g., the first occurring HE-LTF in the DL NDP 236), and the client station 154 records the time $t_{4,k}$ at which the client station 154 began receiving the particular portion of the DL NDP 236 (e.g., the first occurring HE-LTF in the DL NDP 236).

In some embodiments, when transmitting the DL NDP 236, the AP 114 records an $AoD_{2,k}$ at which the DL NDP 236 left the antennas 138 of the AP 114. Similarly, when the client station 154 receives the DL NDP 236, the client station 154 records an $AoA_{2,k}$ at which the DL NDP 236 arrived at the antennas 178 of the client station 154.

In some embodiments, the MU ranging measurement exchange 200 omits the DL PPDU 228. For example, the AP 114 begins transmitting the DL PPDU 232 a defined time period after an end of the UL MU transmission 220. In an embodiment, the defined time period is SIFS. In other embodiments, another suitable time period is utilized.

The DL FB exchange 210 includes a DL PPDU 240 (which may be a DL OFDMA transmission or a DL MU-MIMO transmission) having FB frames 244 for multiple client stations 154, e.g., STA1, STA2, STA3, and STA4. The FB frames 244 are illustrated in FIG. 2A as being transmitted in different frequency bandwidth portions. In some embodiments, two or more of the FB frames 244 are transmitted within a same frequency band (e.g., two or more of the FB frames 244 span the same frequency band) using different spatial streams (e.g., the two or more FB frames 244 are transmitted using MU-MIMO).

In some embodiments, the DL PPDU 240 is transmitted a defined time period after an end of the DL PPDU 232. In an embodiment, the defined time period is SIFS. In other embodiments, another suitable time period is utilized. In other embodiments, the DL PPDU 240 is transmitted after some delay. As discussed above, in some embodiments, the DL PPDU 240 is not transmitted within a same TXOP as the DL PPDU 232.

The FB frames 244 respectively include the recorded times $t_{2,k}$ and $t_{3,k}$. In some embodiments, each of one or more FB frames 244 respectively includes (optionally) the recorded angles $AoA_{1,k}$ and $AoD_{2,k}$. In some embodiments, the FB frames 244 optionally also include respective channel estimate information determined by the AP 114 based on reception of the UL NDPs 224.

After receipt of the FB frames 244, one or more of the client stations 154 respectively calculate one or more respective of times-of-flight between the AP 114 and the one or more client stations 154 using the recorded times $t_{1,k}$, $t_{2,k}$, $t_{3,k}$, and $t_{4,k}$, according to an embodiment. Any suitable technique, including currently known techniques, may be utilized to calculate a time-of-flight using the recorded times $t_{1,k}$, $t_{2,k}$, $t_{3,k}$, and $t_{4,k}$. Respective distances between the AP 114 and the client stations 154 may be calculated using the calculated times-of-flight, e.g., by respectively multiplying the times-of-flight by the speed of light, according to an embodiment.

In some embodiments, one or more of the client stations 154 calculates estimated positions of one or more of the client stations using the calculated times-of-flight. For example, the client station 154-1 uses triangulation techniques to calculate an estimated positions of the client station 154-1 using the calculated time-of-flight. In some embodiments, the client station 154-1 calculates an estimated position of the client station also using the recorded angles $AoD_{1,k}$, $AoA_{1,k}$, $AoD_{2,k}$, and $AoA_{2,k}$. For example, the recorded angles $AoD_{1,k}$, $AoA_{1,k}$, $AoD_{2,k}$, and $AoA_{2,k}$ are used as part of a triangulation algorithm for determining a position of the client station 154-1.

Responsive to receipt of the FB frames 244, the client stations 154 generate an UL MU transmission 250 (which may be an UL OFDMA transmission or an UL MU MIMO transmission) that includes respective ACK frames 254 from respective client stations, according to an embodiment. The client stations 154 transmit as part of the UL MU transmission 250 a defined time period after an end of the DL transmission 240. In an embodiment, the defined time period is SIFS. In other embodiments, another suitable time period is utilized. The ACK frames 254 are illustrated in FIG. 2A as being transmitted in different frequency bandwidth portions. In some embodiments, two or more of the ACK frames 254 are transmitted within a same frequency band (e.g., two or more of the ACK frames 254 span the same frequency band) using different spatial streams (e.g., the two or more ACK frames 254 are transmitted using MU-MIMO). In some embodiments, the client stations 154 do not generate and transmit the UL MU transmission 250 (e.g., the client stations 154 do not generate and transmit the AC frames 254).

In an embodiment, the AP 114 transmits a DL PPDU 260 a defined time period after an end of the UL MU transmission 250. In an embodiment, the defined time period is SIFS. In other embodiments, another suitable time period is utilized. The PPDU 260 includes a trigger frame to cause the group of client stations 154 to simultaneously transmit, as part of an UL MU transmission 264, uplink PPDUs 268 that include ranging measurement feedback. The trigger frame in the PPDU 260 causes multiple client stations 154 to begin simultaneously transmitting the UL MU transmission 264 a defined time period after an end of the PPDU 260. In an embodiment, the defined time period is SIFS. In other embodiments, another suitable time period is utilized.

The UL MU transmission 264 (which may be an UL OFDMA transmission or an UL MU-MIMO transmission) includes UL PPDUs 268 from multiple client stations 154, e.g., STA1, STA2, STA3, and STA4. The UL PPDUs 268 are illustrated in FIG. 2A as being transmitted in different frequency bandwidth portions. In some embodiments, two or more of the UL PPDUs 268 are transmitted within a same frequency band (e.g., two or more of the UL PPDUs 268 span the same frequency band) using different spatial streams (e.g., the two or more UL PPDUs 268 are transmitted using MU-MIMO).

The UL PPDUs 268 correspond to uplink ranging measurement feedback packets. The PPDUs 268 respectively include the recorded times $t_{1,k}$ and $t_{4,k}$. In some embodiments, each of one or more PPDUs 268 respectively includes (optionally) the recorded angles $AoD_{1,k}$ and $AoA_{2,k}$. In some embodiments, the PPDUs 268 optionally also include respective channel estimate information determined by the client station 154 based on reception of the DL NDP 236.

After receipt of the PPDUs 268, the AP 114 calculates respective of times-of-flight between the AP 114 and the client stations 154 using the recorded times $t_{1,k}$, $t_{2,k}$, $t_{3,k}$, and $t_{4,k}$, according to an embodiment. Any suitable technique, including currently known techniques, may be utilized to calculate a time-of-flight using the recorded times $t_{1,k}$, $t_{2,k}$, $t_{3,k}$, and $t_{4,k}$. Respective distances between the AP 114 and the client stations 154 may be calculated using the calculated times-of-flight, e.g., by respectively multiplying the times-of-flight by the speed of light, according to an embodiment.

In some embodiments, the AP 114 calculates estimated positions of one or more of the client stations using the calculated times-of-flight. For example, the AP 114 uses triangulation techniques to calculate estimated positions of one or more of the client stations using the calculated times-of-flight. In some embodiments, the AP 114 calculates estimated positions of one or more of the client stations also using the recorded angles $AoD_{1,k}$, $AoA_{1,k}$, $AoD_{2,k}$, and $AoA_{2,k}$. For example, the recorded angles $AoD_{1,k}$, $AoA_{1,k}$, $AoD_{2,k}$, and $AoA_{2,k}$ are used as part of a triangulation algorithm for determining positions of communication devices.

In another embodiment, the order, in time, of the DL FB exchange 210 and the UL FB exchange 212 is reversed, and the UL FB exchange 212 occurs before the DL FB exchange 210. In some embodiments, the DL FB exchange 210 is omitted. In some embodiments, the UL FB exchange 212 is omitted.

In some embodiments, the AP 114 assigns network identifiers (sometimes referred to herein as association identifiers (AIDs)) to client stations 154 upon the client stations 154 becoming associated with a basic service set (BSS) managed by the AP 114. For example, if a client station 154 requests to become associated with the BSS and the AP 114 determines that the client station 154 is permitted to become associated with the BSS, the AP 114 will assign an AID to the client station 154 and inform the client station 154 of the AID assigned to the client station. While the client station 154 is associated with the BSS, the AP 114 and the client station 154 use the AID in PPDUs and/or MPDUs exchanged between the AP 114 and associated client station 154. For example, when the associated client station 154 participates in the MU ranging measurement exchange 200, the AP 114 and the client station 154 use the AID in PPDUs and/or MPDUs exchanged during the MU ranging measurement exchange 200, such as in one of, or any suitable combination of two or more of, i) the PPDU 216 and/or the trigger frame within the PPDU 216, ii) one of the UL NDPs 224, iii) the PPDU 228 and/or the NDP announcement frame within the PPDU 228, iv) the DL NDP 236, v) one of the DL FB PPDUs 244 and/or an MPDU within the DL FB PPDU 244, vi) one of the UL ACKs 254, vii) the PPDU 260 and/or the trigger frame within the PPDU 260, and viii) one of the UL FB PPDUs 268 and/or an MPDU within the UL FB PPDU 268.

The AP 114, however, sometimes performs a ranging measurement exchange with one or more client stations 154 that are not associated with the BSS (sometimes referred to as "unassociated client stations"), in some embodiments. Thus, the AP 114 assigns preliminary AIDs (pre-AIDs) to at least some unassociated client stations 154 prior to the MU ranging measurement exchange 200, according to some embodiments. When the unassociated client station 154 participates in the MU ranging measurement exchange 200, the AP 114 and the unassociated client station 154 use the pre-AID in PPDUs and/or MPDUs exchanged during the MU ranging measurement exchange 200, such as in one of, or any suitable combination of two or more of, i) the PPDU 216 and/or the trigger frame within the PPDU 216, ii) one of the UL NDPs 224, iii) the PPDU 228 and/or the NDP announcement frame within the PPDU 228, iv) the DL NDP 236, v) one of the DL FB PPDUs 244 and/or an MPDU within the DL FB PPDU 244, vi) one of the UL ACKs 254, vii) the PPDU 260 and/or the trigger frame within the PPDU 260, and viii) one of the UL FB PPDUs 268 and/or an MPDU within the UL FB PPDU 268.

In an embodiment, the AP 114 assigns both i) AIDs to associated client stations 154 and ii) pre-AIDs to unassociated client stations from a same set of AID values (e.g., the set includes values 1-2007, or another suitable range of values), such that no two client stations 154 are assigned a same value of an AID or pre-AID. For example, when a value in the set is currently assigned as an AID or a pre-AID to a client station 154, the AP 114 will not assign the same value to another client station 154 as an AID or a pre-AID. In such embodiments, a ranging measurement session can involve both associated client stations 154 and unassociated client stations 154. In an embodiment, a first subset of values in the set is reserved for associated client stations, and the AP 114 assigns AIDs to associated client stations 154 from the first subset; and a second subset of values (which does not overlap with the first subset) in the set is reserved for unassociated client stations, and the AP 114 assigns pre-AIDs to unassociated client stations 154 from the second subset.

In another embodiment, the AP 114 is permitted to reuse an AID value for a currently associated client station 154 as a pre-AID for an unassociated client station 154. In such an embodiment, a ranging measurement sessions such as described herein are performed separately for association client stations 154 and unassociated client stations 154, such that a ranging measurement sessions involves i) only associated client stations 154, or ii) only unassociated client stations 154.

In an embodiment, the AP 114 includes the pre-AID in an MPDU one or more of the DL transmissions illustrated in FIG. 2A. For example, the trigger frame 216 includes a plurality of user information fields (user info fields) corresponding to client stations 154 that are to participate in the UL MU transmission 220. For instance, one of the user inform fields identifies (e.g., by including the pre-AID in the user info field) that the unassociated client station 154 is to transmit an NDP as part of the UL MU transmission 220, according to an embodiment. Additionally, the user info field that includes the pre-AID also indicates on which one or more spatial streams the unassociated client station 154 is to transmit an NDP as part of the UL MU transmission 220, according to an embodiment.

In an embodiment, the AP 114 includes the pre-AID in a PHY preamble one or more of the DL transmissions illustrated in FIG. 2A. For example, the PPDU 260 includes a signal field (e.g., a high efficiency WiFi (HE) signal field B (HE-SIGB), where the HE-SIGB field includes a plurality of user info fields corresponding to a plurality of client stations 154 that are to participate in the MU UL transmission 264, and where each user info field includes a respective AID or pre-AID. In an embodiment, the relative positions of the user info fields within the HE-SIGB indicate (in conjunction with other information in the HE-SIGB (e.g., resource unit (RU) allocation information in a common information field)) in which frequency block each client station 154 is to transmit as part of the MU UL transmission 264. Additionally, the user info field that includes the pre-AID also indicates on which one or more spatial streams the unassociated client station 154 is to transmit as part of the UL MU transmission 264, according to an embodiment.

Similarly, as another example, the PPDU 240 includes an HE-SIGB field with a plurality of user info fields corresponding to a plurality of client stations 154 that are to participate in the MU UL transmission 250, and where each user info field includes a respective AID or pre-AID, according to an embodiment.

Figure 3:
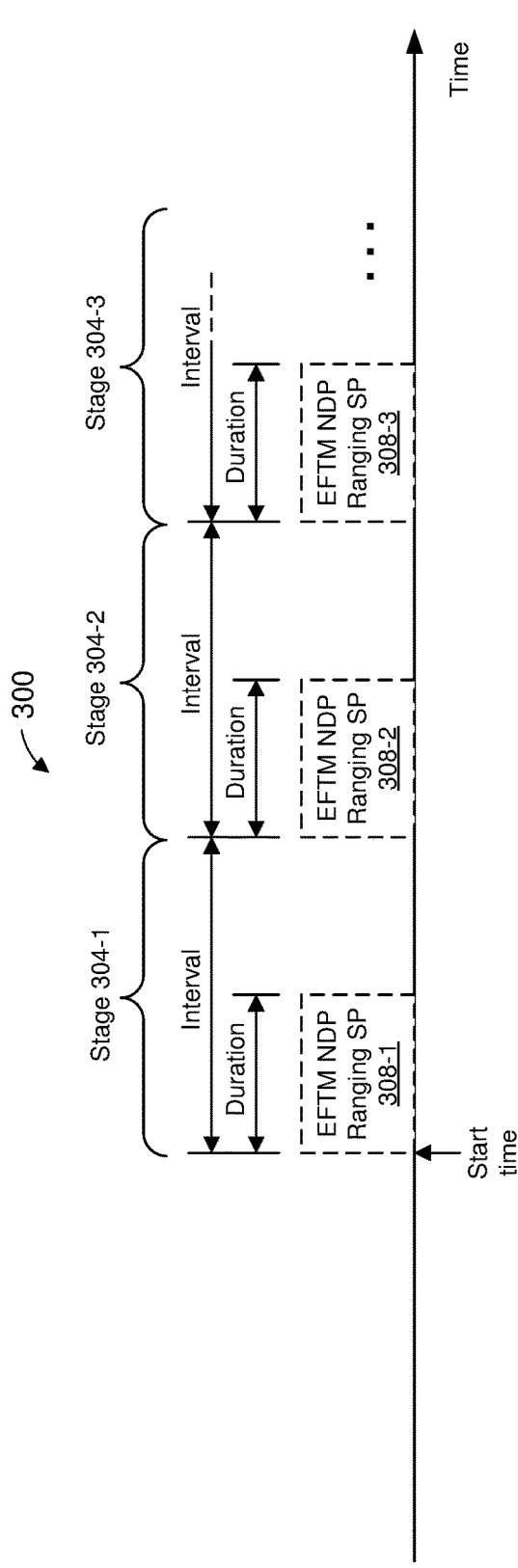
FIG. 3 is a timing diagram of an example MU ranging measurement procedure, according to an embodiment.

FIG. 3 is a timing diagram of an example MU ranging measurement procedure 300, according to an embodiment. The diagram of FIG. 3 is described in the context of the example network 110 merely for explanatory purposes. In some embodiments, signals illustrated in FIG. 3 are generated by other suitable communication devices in other suitable types of wireless networks.

The MU ranging measurement procedure 300 begins at a start time and includes a plurality of stages 304. In an embodiment, the AP 114 performs one or more MU ranging measurement exchanges with different sets of client stations 154 in the stages 304. Each stage 304 includes a time slot 308 (sometimes referred to herein as an enhanced fine timing measurement (EFTM) service period (SP)). In an embodiment, a first time slot 308-1 begins at the start time of the MU ranging measurement procedure 300. The time slots 308 occur at an interval.

The AP 114 schedules a set of client stations 154 to participate in one or more ranging measurement exchanges (e.g., the MU ranging measurement exchange 200 of FIG. 2A or another suitable MU ranging measurement exchange) during each stage 304. Outside of the negotiated stage 304, the AP 114 and one or more client stations 154 optionally participate in respective one or more SU ranging measurement exchanges, according to an embodiment.

In an embodiment, within each of one or more of the time slots 308, the AP 114 transmits to client stations 154 one or more packets (sometimes referred to herein as "scheduling packets") that indicates which set of client stations 154 are to participate in the one or more ranging measurement exchanges in the corresponding stage 304. If a client station 154 determines, based on receiving the one or more scheduling packets during a time slot 308, that the client station 154 is not to participate in a ranging measurement exchange during the corresponding stage 304, the network interface device 162 of the client station 154 is permitted to transition to a low power state (sometimes referred to herein as a sleep state) upon an end of the time slot 308, according to an embodiment. For example, the network interface device 162 is permitted to transition to the low power state at the end of the time slot 308 and to remain in the low power state until a beginning of the next time slot 308 in the next stage 304. Prior to a beginning of the next time slot 308, the network interface device 162 transitions to an active state so that the network interface device 162 is ready to receive from the AP 114 within the next time slot 308 the one or more scheduling packets that indicates which set of client stations 154 are to participate in the one or more ranging measurement exchanges in the next stage 304.

In some embodiments, one or more scheduling packets include one or more pre-AIDs of one or more unassociated client station 154, wherein the AP 114 includes a pre-AID in a scheduling packet to indicate to the unassociated client station 154 in which time slot(s) 308 the unassociated client station 154 is to participate in the MU ranging measurement exchange 200 of FIG. 2A or another suitable MU ranging measurement exchange.

To facilitate an MU ranging measurement procedure such as the MU ranging measurement procedure 300 discussed above, the AP 114 communicates to the client stations 154 an indication of a start time of the MU ranging measurement procedure, an indication of an interval of the stages of the MU ranging measurement procedure, and an indication of a duration of each time slot, according to some embodiments.

In some embodiments, when the AP 114 assigns a pre-AID to an unassociated client station 154, the pre-AID becomes invalid for unassociated client station 154 after the end of the MU ranging measurement procedure 300. Thus, the AP 114 will no longer recognize the pre-AID as corresponding to the unassociated client station 154 after the end of the MU ranging measurement procedure 300, according to an embodiment. In some embodiments, the MU ranging measurement procedure 300 is ended by the client station 154 terminating the MU ranging measurement procedure 300 or the AP 114 terminating the MU ranging measurement procedure 300.

Figure 4:
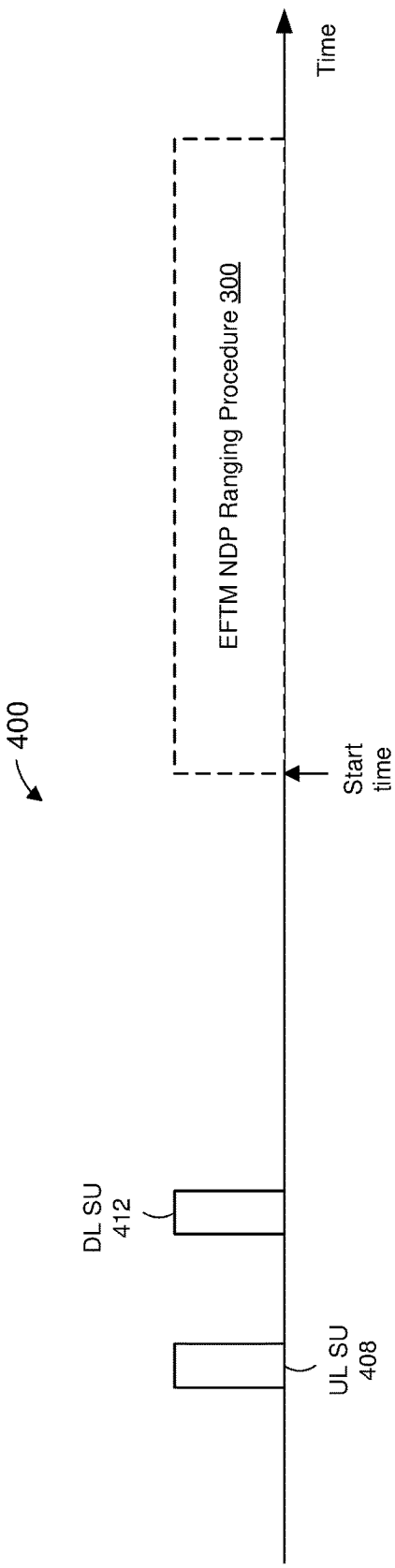
FIG. 4 is a timing diagram of an example MU ranging measurement procedure, according to an embodiment.

FIG. 4 is a timing diagram of an example transmission exchange 400 in which the AP 114 performs a ranging measurement setup procedure prior to the MU ranging measurement procedure 300, according to an embodiment. The diagram of FIG. 4 is described in the context of the example network 110 merely for explanatory purposes. In some embodiments, signals illustrated in FIG. 4 are generated by other suitable communication devices in other suitable types of wireless networks.

In an embodiment, one client station 154 transmits a request to participate in a ranging measurement procedure in an UL SU transmission 408. The request transmitted by the client station 154 in the UL SU transmission 408 is sometimes referred to herein as an "EFTM request frame".

The network interface device 122 of the AP 114 processes the UL SU transmission 408 to determine which client station 154 is requesting to participate in a ranging measurement procedure. For a request to participate received from an unassociated client station 154, the network interface device 122 assigns a pre-AID to the unassociated client station 154.

In an embodiment, the network interface device 122 of the AP 114 generates a DL SU PPDU 412 that includes a unicast frame with information corresponding to an MU ranging measurement procedure, such as the example MU ranging measurement procedure 300 of FIG. 3. For example, in an embodiment, the information corresponding to the MU ranging measurement procedure includes an indication of a start time of the MU ranging measurement procedure 300, an indication of an interval of the stages of the MU ranging measurement procedure 300, and an indication of the duration of each time slot 308 of the MU ranging measurement procedure 300.

Additionally, the information corresponding to an MU ranging measurement procedure also includes pre-AIDs assigned to respective unassociated client stations 154. Upon receiving the DL SU PPDU 412, the unassociated client station 154 processes the DL SU PPDU 412 to determine information regarding an upcoming MU ranging measurement procedure, including the pre-AID assigned to the unassociated client station 154 for the upcoming MU ranging measurement procedure.

The information transmitted by the AP 114 in the DL transmission 412 is included in a MAC frame that is sometimes referred to herein as an "EFTM response frame".

As discussed above, packets transmitted by the AP 114 and the client stations 154 include a BSS color ID in PHY headers of the packets. For example, an HE-SIG field in the PHY headers of the packets includes a BSS color subfield. For example, the UL MU transmissions by client stations 154 in the ranging procedures discussed above (such as the UL NDPs 224 (FIG. 2A), UL ACKs 254 (FIG. 2A), UL FB packets 268 (FIG. 2A), UL packets 408 (FIG. 4), etc.) include a BSS color subfield in the HE-SIG field. An UL MU transmission often involves multiple client stations transmitting, at least PHY preambles, simultaneously over the same frequency portion.

Figure 5B:
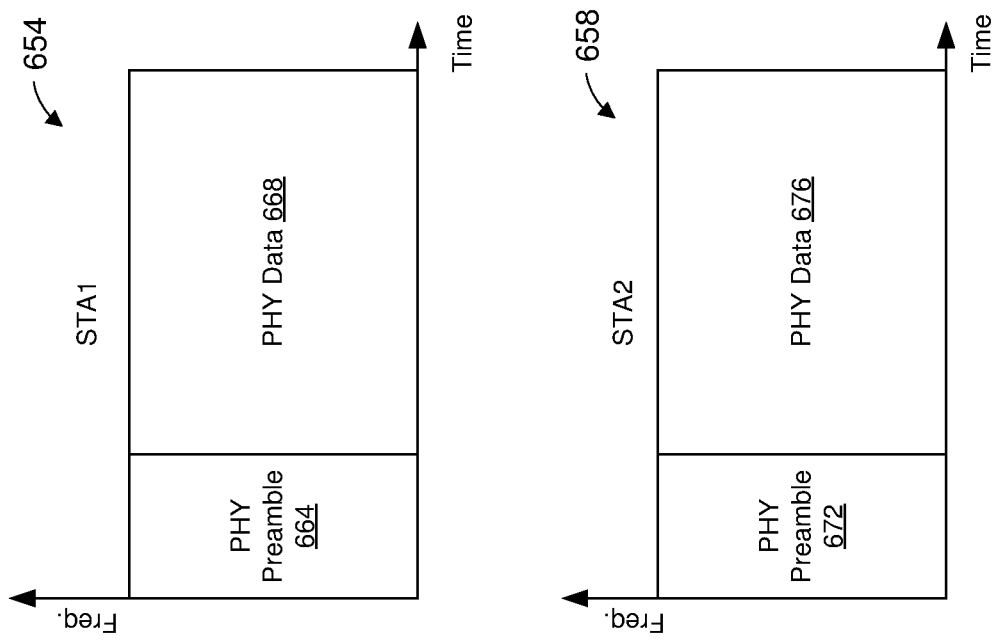
FIG. 5B illustrates timing diagrams of transmissions by multiple client stations participating in an uplink MU multiple input, multiple output transmission, according to an embodiment.
Figure 5A:
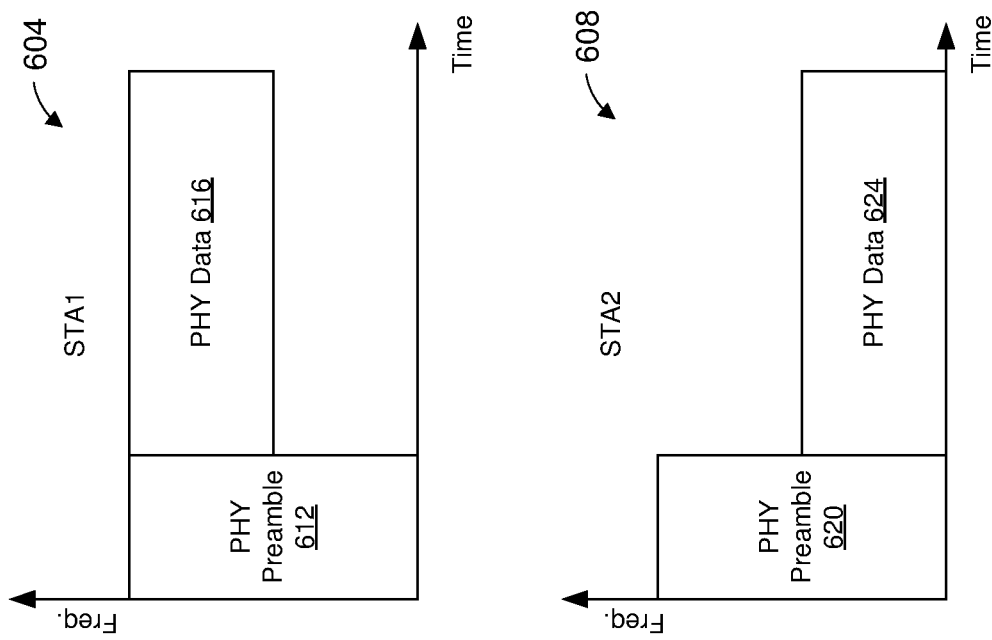
FIG. 5A illustrates timing diagrams of transmissions by multiple client stations participating in an uplink orthogonal frequency division multiple access transmission, according to an embodiment.

For example, FIG. 5A illustrates timing diagrams of a transmission 604 by a first client station (STA1) and a transmission 608 by a second client station (STA2), as part of an UL OFDMA transmission to an AP. The transmission 604 by STA1 includes i) a PHY preamble 612 that spans a communication channel (e.g., a 20 MHz communication channel or another suitable bandwidth), and ii) a PHY data portion 616 that spans, in frequency, only a first portion (e.g., spans a first RU) of the communication channel The transmission 608 by STA2 includes i) a PHY preamble 620 that spans the communication channel (e.g., the 20 MHz communication channel or another suitable bandwidth), and ii) a PHY data portion 624 that spans, in frequency, only a second portion (e.g., spans a second RU) of the communication channel Thus, the PHY preamble 612 transmitted by STA1 spans the same frequency as the PHY preamble 620 transmitted by STA2, and the transmission of the PHY preamble 612 by STA1 overlaps in time with the transmission of the PHY preamble 620 by STA2. If STA1 is an associated client station and STA2 is an unassociated client station, the BSS color subfield in the PHY preamble 612 may have a different value than the BSS color subfield in the PHY preamble 620, which may lead to the AP and/or neighboring stations being unable to correctly process the PHY preamble 612 and the PHY preamble 620. For example, the BSS color subfield in the PHY preamble 612 may be set to the BSS color ID of the BSS being managed by the AP 114 (e.g., which is within the range of values specified for BSS color IDs, e.g., a non-zero value) whereas the BSS color subfield in the PHY preamble 620 may be set to the predetermined value that is reserved for a transmission of a packet to another communication device in a BSS to which the transmitting device does not belong (e.g., zero).

FIG. 5B illustrates timing diagrams of a transmission 654 by a first client station (STA1) and a transmission 658 by a second client station (STA2), as part of an UL MU-MIMO transmission to the AP. The transmission 654 by STA1 includes a PHY preamble 664 and a PHY data portion 668 that both span a communication channel (e.g., a 20 MHz communication channel or another suitable bandwidth). The PHY data portion 668 is transmitted via a first spatial stream. The transmission 658 by STA2 includes a PHY preamble 672 and a PHY data portion 676 that both span the communication channel (e.g., the 20 MHz communication channel or another suitable bandwidth). The PHY data portion 676 is transmitted via a second spatial stream. Thus, the PHY preamble 664 transmitted by STA1 spans the same frequency as the PHY preamble 672 transmitted by STA2, and the transmission of the PHY preamble 664 by STA1 overlaps in time with the transmission of the PHY preamble 672 by STA2. If STA1 is an associated client station and STA2 is an unassociated client station, the BSS color subfield in the PHY preamble 664 may have a different value than the BSS color subfield in the PHY preamble 672, which may lead to the AP and/or neighboring stations being unable to correctly process the PHY preamble 664 and the PHY preamble 672. For example, the BSS color subfield in the PHY preamble 664 may be set to the BSS color ID of the BSS being managed by the AP 114 (e.g., which is within the range of values specified for BSS color IDs, e.g., a non-zero value) whereas the BSS color subfield in the PHY preamble 672 may be set to the predetermined value that is reserved for a transmission of a packet to another communication device in a BSS to which the transmitting device does not belong (e.g., zero).

In some embodiments, client stations participating in an MU ranging procedure follow rules to help ensure that the client stations participating in the MU ranging procedure populate the BSS color ID subfield in the PHY preambles with the same value.

For example, in an embodiment, when an unassociated client station 154 is to participate in an MU ranging procedure with the AP 114, the unassociated client station 154 determines the BSS color ID of the BSS being managed by the AP 114. Then, the unassociated client station 154, when participating in UL MU transmissions during the MU ranging procedure with the AP 114, sets the BSS color subfield in the PHY preambles of the transmissions by the unassociated client station 154 to the BSS color ID of the BSS being managed by the AP 114. In such an embodiment, both associated client stations and unassociated client stations will set the BSS color subfield in the PHY preambles of the UL MU transmissions to the BSS color ID of the BSS being managed by the AP 114. Referring again to FIG. 1, in some embodiments, the network interface 162 of the client station 154-1 is configured to, while the client station 154-1 is not associated with a wireless network managed by the AP 114, participate in a ranging procedure with AP 114, including transmitting a packet to the AP as part of the ranging procedure, where the packet includes a PHY preamble, the PHY preamble includes a signal field, and the signal field includes a wireless network identifier subfield set to an identifier of the wireless network.

In an embodiment, the unassociated client station 154 receives a packet transmitted by the AP 114, where the packet includes a beacon frame. The packet that includes the beacon frame also includes a PHY header with a BSS color subfield set to the BSS color ID of the BSS being managed by the AP 114. Additionally or alternatively, the beacon frame includes a BSS color subfield set to the BSS color ID of the BSS being managed by the AP 114. In such an embodiments, the unassociated client station determines the BSS color ID of the BSS being managed by the AP 114 using the packet, transmitted by the AP 114, that includes the beacon frame.

In another embodiment, the unassociated client station 154 receives a packet transmitted by the AP 114, where the packet includes an EFTM response frame. The packet that includes the EFTM response frame also includes a PHY header with a BSS color subfield set to the BSS color ID of the BSS being managed by the AP 114. Additionally or alternatively, the EFTM response frame includes a BSS color subfield set to the BSS color ID of the BSS being managed by the AP 114. In such embodiments, the unassociated client station determines the BSS color ID of the BSS being managed by the AP 114 using the packet, transmitted by the AP 114, that includes the EFTM response frame.

In some situations, the AP 114 must change the BSS color ID of the BSS, for example, due to use of the same BSS color ID by another neighboring BSS. To inform unassociated client stations participating in an MU ranging procedure of the BSS color ID change, the AP 114 transmits an unsolicited frame (e.g., an unsolicited EFTM response frame) to the unassociated client station. The unsolicited EFTM response frame also includes a BSS color change subfield set to indicate a new BSS color ID of the BSS being managed by the AP 114. In such embodiments, the unassociated client station determines the new BSS color ID of the BSS being managed by the AP 114 using the unsolicited EFTM response frame. In an embodiment, the AP 114 terminates the MU ranging agreement with the unassociated STAs when the BSS color announced by the AP 114 changes to a new value. The unassociated STAs can re-negotiate the MU ranging agreement with the AP 114, through which the new BSS color is acquired.

Some ranging procedures involve UL single user (SU) transmissions from unassociated client stations. In some embodiments, when an unassociated client station 154 is to participate in a ranging procedure with the AP 114 that involves one or more UL SU transmissions, the unassociated client station 154 determines the BSS color ID of the BSS being managed by the AP 114. Then, the unassociated client station 154, when participating in UL SU transmissions during the ranging procedure with the AP 114, sets the BSS color subfield in the PHY preambles of the transmissions by the unassociated client station 154 to the BSS color ID of the BSS being managed by the AP 114.

In another embodiment, an associated client station, when participating in UL MU transmissions during an MU ranging procedure with the AP 114, sets the BSS color subfield in the PHY preambles of the transmissions by the associated client station 154 to the predetermined value that is reserved for a transmission of a packet to another communication device in a BSS to which the transmitting device does not belong (e.g., zero). In other words, the associated client station, when participating in UL MU transmissions during an MU ranging procedure with the AP 114, does not set the BSS color subfield in the PHY preambles of the transmissions by the associated client station 154 to the BSS color ID of the BSS being managed by the AP 114. In such an embodiment, both associated client stations and unassociated client stations will set the BSS color subfield in the PHY preambles of the UL MU transmissions to the predetermined value that is reserved for a transmission of a packet to another communication device in a BSS to which the transmitting device does not belong (e.g., zero).

Figure 6:
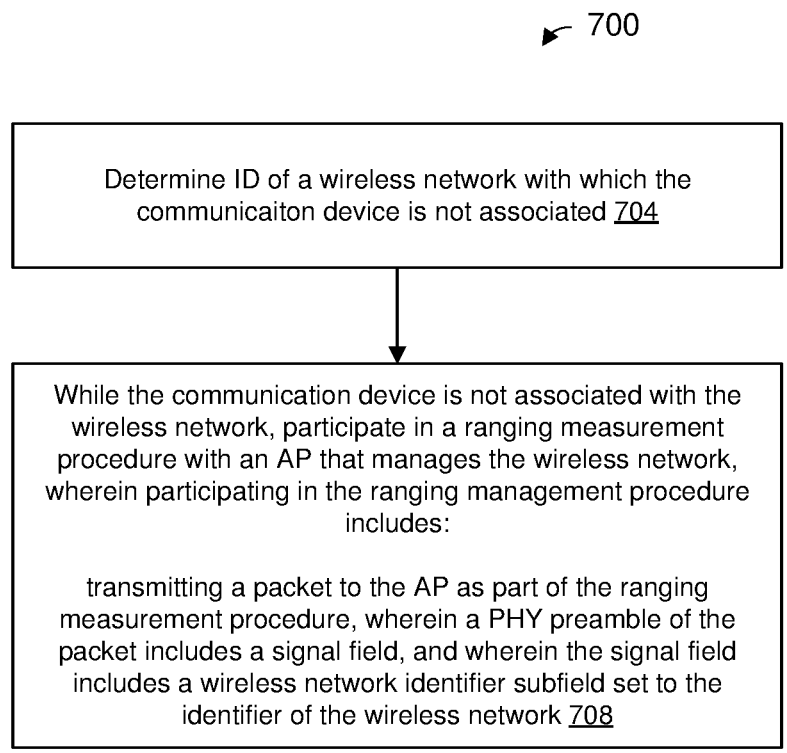
FIG. 6 is a flow diagram of an example method for an unassociated client station participating in a ranging measurement procedure, according to an embodiment.

In other embodiments, the AP 114 does not allocate, for an UL MU transmission for an MU ranging procedure, RUs to both an associated client station and an unassociated client station in a same communication channel FIG. 6 is a flow diagram of an example method 700 for performing a ranging measurement procedure, according to an embodiment. In some embodiments, the network interface device 162 of FIG. 1 is configured to implement the method 700. The method 700 is described in the context of the network interface device 162 merely for explanatory purposes and, in other embodiments, the method 700 is implemented by another suitable device. For instance, in an embodiment, the network interface device 122 of FIG. 1, or another suitable WLAN network interface device is configured to implement the method 700.

At block 704, a communication device determines (e.g., the network interface device 162 determines, the MAC processor 126 determines, etc.) an identifier of a wireless network with which the communication device is not associated.

In an embodiment, the method 700 further includes receiving, at the communication device, a beacon frame from the AP, wherein the beacon frame includes the identifier of the wireless network; and determining the identifier of the wireless network at block 704 includes determining the identifier of the wireless network based on receiving the beacon frame from the AP.

In another embodiment, the method 700 further includes: transmitting, by first communication device, a request frame to the AP, wherein the request frame indicates that the communication device is requesting to participate in the ranging procedure with the AP; and receiving, at the communication device, a response frame from the AP, wherein the response frame is responsive to the request frame, and wherein the response frame includes the identifier of the wireless network; wherein determining the identifier of the wireless network at block 704 includes determining the identifier of the wireless network based on receiving the response frame from the AP.

In another embodiment, the method 700 further includes: receiving, at the communication device, a ranging procedure setup frame from the AP, wherein the ranging procedure setup frame is not responsive to any frame from the communication device, and wherein the ranging procedure setup frame includes the identifier of the first wireless network; wherein determining the identifier of the wireless network includes determining the identifier of the wireless network based on receiving the ranging procedure setup frame from the AP. In an embodiment, the ranging procedure setup frame comprises an unsolicited response frame from the AP, wherein the unsolicited response frame includes the identifier of the wireless network.

At block 708, while the first communication device is not associated with the wireless network, the communication device participates in a ranging procedure with an AP of the wireless network. In an embodiment, participating in the ranging procedure includes the communication device transmitting a packet to the AP as part of the ranging procedure, wherein the packet includes a PHY preamble, wherein the PHY preamble includes a signal field, and wherein the signal field includes a wireless network identifier subfield set to the identifier of the wireless network.

In an embodiment, the ranging procedure is an MU ranging procedure with the AP; and the packet is transmitted to the AP as part of an uplink MU transmission.

In an embodiment, the packet is transmitted to the AP as part of an uplink MU-MIMO transmission.

In an embodiment, the packet is transmitted to the AP as part of an uplink OFDMA transmission.

In an embodiment, the packet is transmitted to the AP as an uplink single user transmission.

Figure 7:
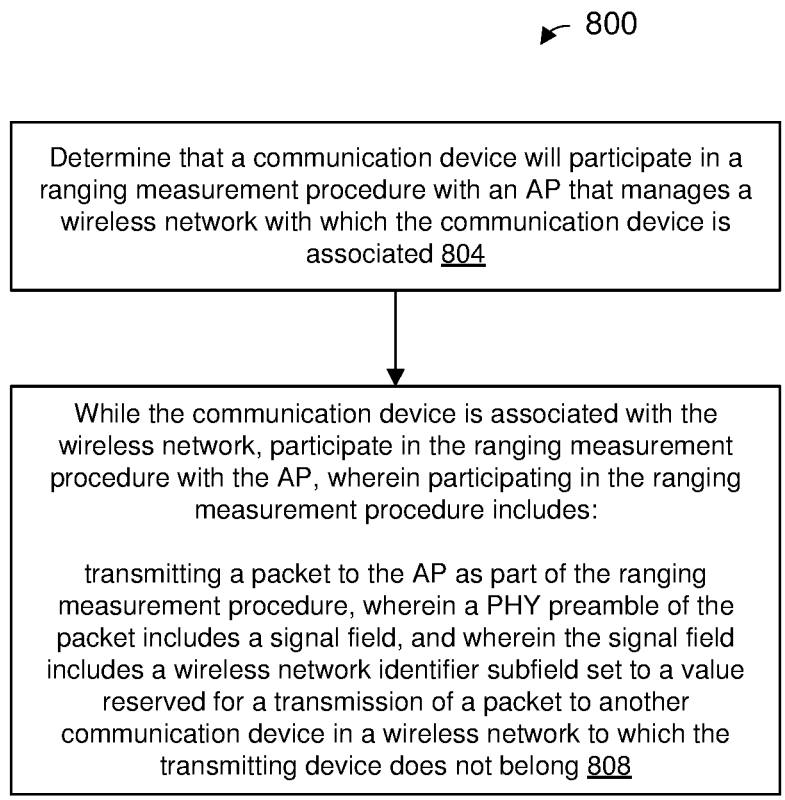
FIG. 7 is a flow diagram of an example method for an associated client station participating in a ranging measurement procedure, according to an embodiment.

FIG. 7 is a flow diagram of an example method 800 for performing a ranging measurement procedure, according to an embodiment. In some embodiments, the network interface device 162 of FIG. 1 is configured to implement the method 800. The method 800 is described in the context of the network interface device 162 merely for explanatory purposes and, in other embodiments, the method 800 is implemented by another suitable device. For instance, in an embodiment, the network interface device 122 of FIG. 1, or another suitable WLAN network interface device is configured to implement the method 800.

At block 804, a communication device determines (e.g., the network interface device 162 determines, the MAC processor 126 determines, the host processor 158 determines, etc.) determines that the communication device will participate in an MU ranging measurement procedure with an AP that manages a wireless network with which the communication device is associated.

At block 808, while the first communication device is associated with the wireless network, the communication device participates in an MU ranging procedure with the AP. In an embodiment, participating in the MU ranging procedure includes the communication device transmitting a packet to the AP as part of an uplink MU transmission and as part of the MU ranging procedure, wherein the packet includes a PHY preamble, wherein the PHY preamble includes a signal field, and wherein the signal field includes a wireless network identifier subfield set to a value reserved for a transmission of a packet to another communication device in a wireless network to which the transmitting device does not belong. The value of the wireless network identifier subfield is different than an identifier of the wireless network that is managed by the AP and to which the communication device belongs. In an embodiment, the identifier of the wireless network is a BSS color ID selected from a specified range of values (e.g., 1-63 or another suitable range of values); and the wireless network identifier subfield is set to a predetermined value (e.g., zero or another suitable value) that is not included in the specified range.

In an embodiment, the packet is transmitted to the AP as part of an uplink MU-MIMO transmission.

In an embodiment, the packet is transmitted to the AP as part of an uplink OFDMA transmission.

Embodiment 1: A method, comprising: determining, at a communication device, an identifier of a wireless network with which the communication device is not associated; and while the communication device is not associated with the wireless network, participating, by the communication device, in a ranging procedure with an access point (AP) of the wireless network. The ranging procedure is for estimating a distance between the communication device and the AP based on measuring times of flight of transmissions between the communication device and the AP. Participating in the ranging procedure includes: transmitting, by the communication device, a packet to the AP as part of the ranging procedure, wherein the packet includes a PHY preamble, wherein the PHY preamble includes a signal field, and wherein the signal field includes a wireless network identifier subfield set to the identifier of the wireless network.

Embodiment 2: The method of Embodiment 1, wherein: the ranging procedure is a multi-user (MU) ranging procedure with the AP; and the packet is transmitted to the AP as part of an uplink MU transmission.

Embodiment 3: The method of Embodiment 2, wherein: the packet is transmitted to the AP as part of an uplink MU multiple input, multiple output (MU-MIMO) transmission.

Embodiment 4: The method of Embodiment 2, wherein: the packet is transmitted to the AP as part of an uplink orthogonal frequency division multiple access (OFDMA) transmission.

Embodiment 5: The Embodiment of claim 1, wherein: the packet is transmitted to the AP as an uplink single user transmission.

Embodiment 6: The method of any of Embodiments 1-5, further comprising: receiving, at the communication device, a beacon frame from the AP, wherein the beacon frame includes the identifier of the wireless network; wherein determining the identifier of the wireless network includes determining the identifier of the wireless network based on receiving the beacon frame from the AP.

Embodiment 7: The method of any of Embodiments 1-5, further comprising: transmitting, by communication device, a request frame to the AP, wherein the request frame indicates that the communication device is requesting to participate in the ranging procedure with the AP; and receiving, at the communication device, a response frame from the AP, wherein the response frame is responsive to the request frame, and wherein the response frame includes the identifier of the wireless network; wherein determining the identifier of the wireless network includes determining the identifier of the wireless network based on receiving the response frame from the AP.

Embodiment 8: The method of any of Embodiments 1-5, further comprising: receiving, at the communication device, a ranging procedure setup frame from the AP, wherein the ranging procedure setup frame is not responsive to any frame from the communication device, and wherein the ranging procedure setup frame includes the identifier of the first wireless network; wherein determining the identifier of the wireless network includes determining the identifier of the wireless network based on receiving the ranging procedure setup frame from the AP.

Embodiment 9: The method of Embodiment 8, wherein: the ranging procedure setup frame comprises an unsolicited response frame from the AP, wherein the unsolicited response frame includes the identifier of the wireless network.

Embodiment 10: An apparatus, comprising: a network interface device associated with a communication device, wherein the network interface device includes one or more integrated circuit (IC) devices, and wherein the one or more IC devices are configured to: determine an identifier of a wireless network with which the communication device is not associated, and while the communication device is not associated with the wireless network, participate in a ranging procedure with an access point (AP) of the wireless network. The ranging procedure is for estimating a distance between the communication device and the AP based on measuring times of flight of transmissions between the communication device and the AP. Participating in the ranging procedure includes: transmitting a packet to the AP as part of the ranging procedure, wherein the packet includes a PHY preamble, wherein the PHY preamble includes a signal field, and wherein the signal field includes a wireless network identifier subfield set to the identifier of the wireless network.

Embodiment 11: The apparatus of Embodiment 10, wherein: the ranging procedure is a multi-user (MU) ranging procedure with the AP; and the one or more IC devices are configured to transmit the packet to the AP as part of an uplink MU transmission.

Embodiment 12: The apparatus of Embodiment 11, wherein the one or more IC devices are configured to: transmit the packet to the AP as part of an uplink MU multiple input, multiple output (MU-MIMO) transmission.

Embodiment 13: The apparatus of Embodiment 11, wherein the one or more IC devices are configured to: transmit the packet to the AP as part of an uplink orthogonal frequency division multiple access (OFDMA) transmission.

Embodiment 14: The apparatus of Embodiment 10, wherein the one or more IC devices are configured to: transmit the packet to the AP as an uplink single user transmission.

Embodiment 15: The apparatus of any of Embodiments 10-14, wherein the one or more IC devices are further configured to: receive a beacon frame from the AP, wherein the beacon frame includes the identifier of the wireless network; and determine the identifier of the wireless network based on receiving the beacon frame from the AP.

Embodiment 16: The apparatus of Embodiments 10-14, wherein the one or more IC devices are further configured to: transmit a request frame to the AP, wherein the request frame indicates that the communication device is requesting to participate in the ranging procedure with the AP; receive a response frame from the AP, wherein the response frame is responsive to the request frame, and wherein the response frame includes the identifier of the wireless network; and determine the identifier of the wireless network based on receiving the response frame from the AP.

Embodiment 17: The apparatus of Embodiments 10-14, wherein the one or more IC devices are further configured to: receive a ranging procedure setup frame from the AP, wherein the ranging procedure setup frame is not responsive to any frame from the communication device, and wherein the ranging procedure setup frame includes the identifier of the first wireless network; and determine the identifier of the wireless network based on receiving the ranging procedure setup frame from the AP.

Embodiment 18: The apparatus of Embodiment 17, wherein: the ranging procedure setup frame comprises an unsolicited response frame from the AP, wherein the unsolicited response frame includes the identifier of the wireless network.

Embodiment 19: The apparatus of Embodiments 10-18, wherein: the network interface device includes: a media access control (MAC) processor implemented on the one or more IC devices, and a physical layer (PHY) processor implemented on the one or more IC devices, the PHY processor being coupled to the MAC processor; and the PHY processor is configured to: generate the packet to include the wireless network identifier subfield in the signal field in the PHY preamble, and transmit the packet as part of the ranging procedure.

Embodiment 20: The apparatus of Embodiment 19, wherein: the PHY processor comprises a plurality of transceivers.

Embodiment 21: The apparatus of Embodiment 20, further comprising: a plurality of antennas coupled to the plurality of transceivers.

At least some of the various blocks, operations, and techniques described above may be implemented utilizing hardware, a processor executing firmware instructions, a processor executing software instructions, or any combination thereof When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. The software or firmware instructions may include machine readable instructions that, when executed by one or more processors, cause the one or more processors to perform various acts.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method, comprising:
determining, at a communication device, an identifier of a wireless network with which the communication device is not associated;
while the communication device is not associated with the wireless network, participating, by the communication device, in a ranging procedure with an access point (AP) of the wireless network, wherein:
the ranging procedure is for estimating a distance between the communication device and the AP based on measuring times of flight of transmissions between the communication device and the AP, and
participating in the ranging procedure includes: transmitting, by the communication device, a packet to the AP as part of the ranging procedure, wherein the packet includes a physical layer (PHY) preamble, wherein the PHY preamble includes a signal field, wherein the signal field includes a wireless network identifier subfield set to the identifier of the wireless network, and wherein the identifier of the wireless network comprises a basic service set (BSS) color identifier of a BSS of the wireless network being managed by the AP.

2. The method of claim 1, further comprising:
receiving, at the communication device, a beacon frame from the AP, wherein the beacon frame includes the identifier of the wireless network;
wherein determining the identifier of the wireless network includes determining the identifier of the wireless network based on receiving the beacon frame from the AP.

3. The method of claim 1, further comprising:
transmitting, by communication device, a request frame to the AP, wherein the request frame indicates that the communication device is requesting to participate in the ranging procedure with the AP; and
receiving, at the communication device, a response frame from the AP, wherein the response frame is responsive to the request frame, and wherein the response frame includes the identifier of the wireless network;
wherein determining the identifier of the wireless network includes determining the identifier of the wireless network based on receiving the response frame from the AP.

4. The method of claim 1, further comprising:
receiving, at the communication device, a ranging procedure setup frame from the AP, wherein the ranging procedure setup frame is not responsive to any frame from the communication device, and wherein the ranging procedure setup frame includes the identifier of the wireless network;
wherein determining the identifier of the wireless network includes determining the identifier of the wireless network based on receiving the ranging procedure setup frame from the AP.

5. The method of claim 4, wherein:
the ranging procedure setup frame comprises an unsolicited response frame from the AP, wherein the unsolicited response frame includes the identifier of the wireless network.

6. An apparatus, comprising:
a network interface device associated with a communication device, wherein the network interface device includes one or more integrated circuit (IC) devices, wherein the network interface device further includes one or more processors implemented on the one or more IC devices, and one or more transceivers implemented on the one or more IC devices, and wherein the one or more processors are configured to:
determine an identifier of a wireless network with which the communication device is not associated, and while the communication device is not associated with the wireless network, participate in a ranging procedure with an access point (AP) of the wireless network, wherein:
the ranging procedure is for estimating a distance between the communication device and the AP based on measuring times of flight of transmissions between the communication device and the AP, and
participating in the ranging procedure includes: controlling the one or more transceivers to transmit a packet to the AP as part of the ranging procedure, wherein the packet includes a physical layer (PHY) preamble, wherein the PHY preamble includes a signal field, wherein the signal field includes a wireless network identifier subfield set to the identifier of the wireless network, and wherein the identifier of the wireless network comprises a basic service set (BSS) color identifier of a BSS of the wireless network being managed by the AP.

7. The apparatus of claim 6, wherein the one or more processors are further configured to:
receive a beacon frame from the AP, wherein the beacon frame includes the identifier of the wireless network; and
determine the identifier of the wireless network based on receiving the beacon frame from the AP.

8. The apparatus of claim 6, wherein the one or more IC devices are further configured to:
transmit a request frame to the AP, wherein the request frame indicates that the communication device is requesting to participate in the ranging procedure with the AP;
receive a response frame from the AP, wherein the response frame is responsive to the request frame, and wherein the response frame includes the identifier of the wireless network; and
determine the identifier of the wireless network based on receiving the response frame from the AP.

9. The apparatus of claim 6, wherein the one or more IC devices are further configured to:
receive a ranging procedure setup frame from the AP, wherein the ranging procedure setup frame is not responsive to any frame from the communication device, and wherein the ranging procedure setup frame includes the identifier of the wireless network; and
determine the identifier of the wireless network based on receiving the ranging procedure setup frame from the AP.

10. The apparatus of claim 9, wherein:
the ranging procedure setup frame comprises an unsolicited response frame from the AP, wherein the unsolicited response frame includes the identifier of the wireless network.

11. The apparatus of claim 6, wherein:
the one or more processors include:
a media access control (MAC) processor implemented on the one or more IC devices, and
a physical layer (PHY) processor implemented on the one or more IC devices, the PHY processor being coupled to the MAC processor; and
the PHY processor is configured to:
generate the packet to include the wireless network identifier subfield in the signal field in the PHY preamble, and
control the one or more transceivers to transmit the packet as part of the ranging procedure.

12. The apparatus of claim 11, wherein:
the one or more transceivers are a plurality of transceivers; and
the PHY processor comprises the plurality of transceivers.

13. The apparatus of claim 12, further comprising:
a plurality of antennas coupled to the plurality of transceivers.

* * * * *